United States Patent [19]

Baiden et al.

[11] Patent Number: 5,530,330

[45] Date of Patent: Jun. 25, 1996

[54] AUTOMATED GUIDANCE SYSTEM FOR A VEHICLE

[75] Inventors: Greg Baiden, Lively; Everett Henderson, Whitefish; Samir Zakaria, Sudbury, all of Canada

[73] Assignee: Inco Limited, Toronto, Canada

[21] Appl. No.: 220,385

[22] Filed: Mar. 30, 1994

[51] Int. Cl.⁶ .................................................. G05B 11/01
[52] U.S. Cl. .......................... 318/580; 318/587; 180/116
[58] Field of Search .................................. 318/580, 587; 180/116, 119, 167, 168, 169; 364/424.01

[56] References Cited

U.S. PATENT DOCUMENTS

| | | | |
|---|---|---|---|
| 3,749,493 | 7/1973 | Macorski | 356/2 |
| 4,626,995 | 12/1986 | Lofgren et al. | 364/424 |
| 4,711,316 | 12/1987 | Katou et al. | 180/168 |
| 4,773,018 | 9/1988 | Lundstrom | 364/443 |
| 4,790,402 | 12/1988 | Field et al. | 180/169 |
| 4,811,229 | 3/1989 | Wilson | 364/424.02 |
| 4,844,493 | 7/1989 | Kramer | 180/169 |
| 4,933,864 | 6/1990 | Evans, Jr. et al. | 364/449 |
| 4,947,094 | 8/1990 | Dyer et al. | 318/587 |
| 5,155,684 | 10/1992 | Burke et al. | 364/424 |

OTHER PUBLICATIONS

"Itran Corp. Intelligent Visual Sensors/IVS" (abbreviated, 2 pages undated).

*Primary Examiner*—William M. Shoop, Jr.
*Assistant Examiner*—Karen Masih
*Attorney, Agent, or Firm*—Edward A. Steen

[57] ABSTRACT

A system for automatically steering a vehicle through an irregular structure. A flexible lighting tube, in proximity to the back of the structure, communicates with at least one canted video camera. A processor takes the output of the camera, determines the position of the vehicle, and provides guidance to the vehicle's steering mechanism.

12 Claims, 2 Drawing Sheets

AUTOMATED GUIDANCE SYSTEM FOR A VEHICLE

TECHNICAL FIELD

The instant invention relates to automated vehicles in general and, more particularly, to a guidance system especially useful for locomoting a vehicle over an uneven surface such as a mine floor.

BACKGROUND ART

With increased interest in automating underground operations due to safety and efficiency concerns, the need to develop automatic guided mining vehicles becomes increasingly critical.

Current guidance systems generally either lack the ability to look ahead and/or require on board lighting systems to illuminate a passive reflector. Other systems that incorporate active light emitting sources do not appear to be capable of easily operating in a mine environment. Current systems usually operate on or under smooth surfaces that must accommodate buried wires, lights and other markers.

As opposed to a ceiling in a building, the back (roof) of an underground excavation is generally not horizontally flat. Rather, it may undulate in an irregular fashion. Moreover, the back is loaded with variously sized appurtenances such as pipes, conduits, screens, lamps, etc.

Similarly, whereas the floor of a structure such as a building is generally smooth, the floor of a mine drift may be irregular and bumpy.

In particular, there is a need to guide a vehicle through a repetitive haulage cycle between two points over rough terrain and under an irregular roof surface. Moreover, it has been determined that articulated haulage vehicles are very efficient in such environments.

Clearly, a system for automatically guiding vehicles including scooptrams and the like in a mine is desirable.

SUMMARY OF THE INVENTION

Accordingly, there is provided an automatic guidance system for vehicles that is especially adapted for mining environments. A self propelled vehicle is equipped with at least two angled cameras, each facing in opposing directions. The cameras are connected to a vision system and microprocessor which in turn are connected to the vehicle's steering and drive systems. A flexible illuminated lighting tube is attached to the back of the mine. The cameras, reading the lighting tube, help steer the vehicle.

PREFERRED MODE FOR CARRYING OUT THE INVENTION

Figure 1:
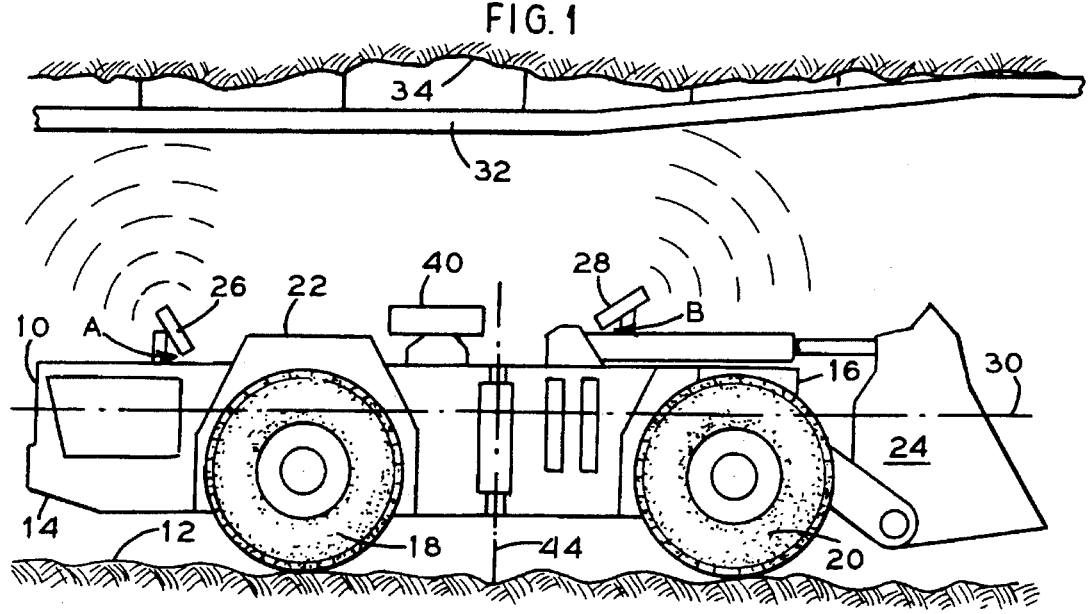
FIG. 1 is an elevation of an embodiment of the invention.

FIG. 1 discloses a vehicle 10 disposed on floor 12. The vehicle 10, preferably articulated along axis 44, has a distal end 14 and a proximal end 16. Both ends 14 and 16 may include steerable wheels 18 and 20. In the embodiment shown, a scooptram 22 having a forward bucket 24 shuttles back and forth over a predetermined course within a mine over the floor 12. As pictured, the floor 12 may be somewhat irregular although it should be understood that flooring conditions vary considerably in underground environments, ranging from smooth to highly rutted.

The vehicle 10 includes a rear facing camera 26 located on the distal end 14 and a forward facing camera 28 located on the proximal end 16. Both cameras are pointed upwardly at known acute angles A and B from an arbitrary vehicle horizontal reference axis 30.

The cameras 26 and 28 point towards an illuminated lighting tube 32 affixed to or hung from the back 34 of the mine.

The lighting tube 32, commercially known as Ropelight™, is a self-illuminating, narrow, flexible strip comprised of small, low wattage incandescent Christmas tree-like bulbs. The tube 32 is made by extruding a polymer cover over the bulbs. The resulting solid core tube 32 may be positioned anywhere where routing instructions are required. Similar flexible continuous lighting sources may also be utilized.

Figure 2:
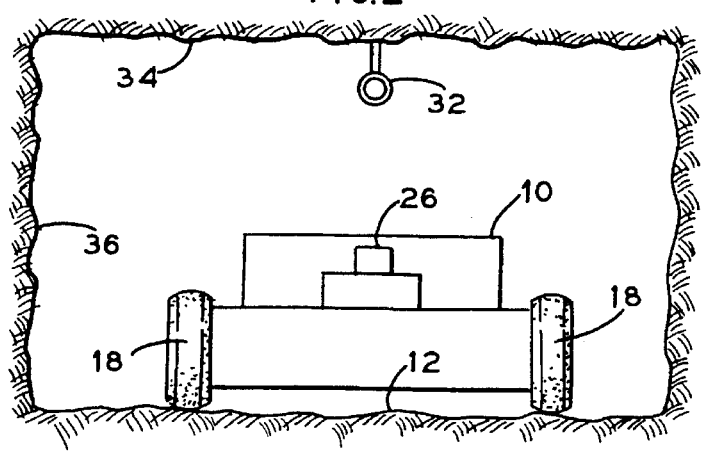
FIG. 2 is a rear view elevation of an embodiment of the invention.

In the instant situation, and as shown in FIG. 2, the tube 32 is situated approximately in the middle of a drift 36 and affixed to the back 34. It is strung from point X to point Y within the drift 36 to define a predetermined path for the vehicle 10 to travel. In most situations, it is expected that the vehicle 10 will automatically shuttle between a loading location and a transfer point with optional excursions in between.

Figure 4:
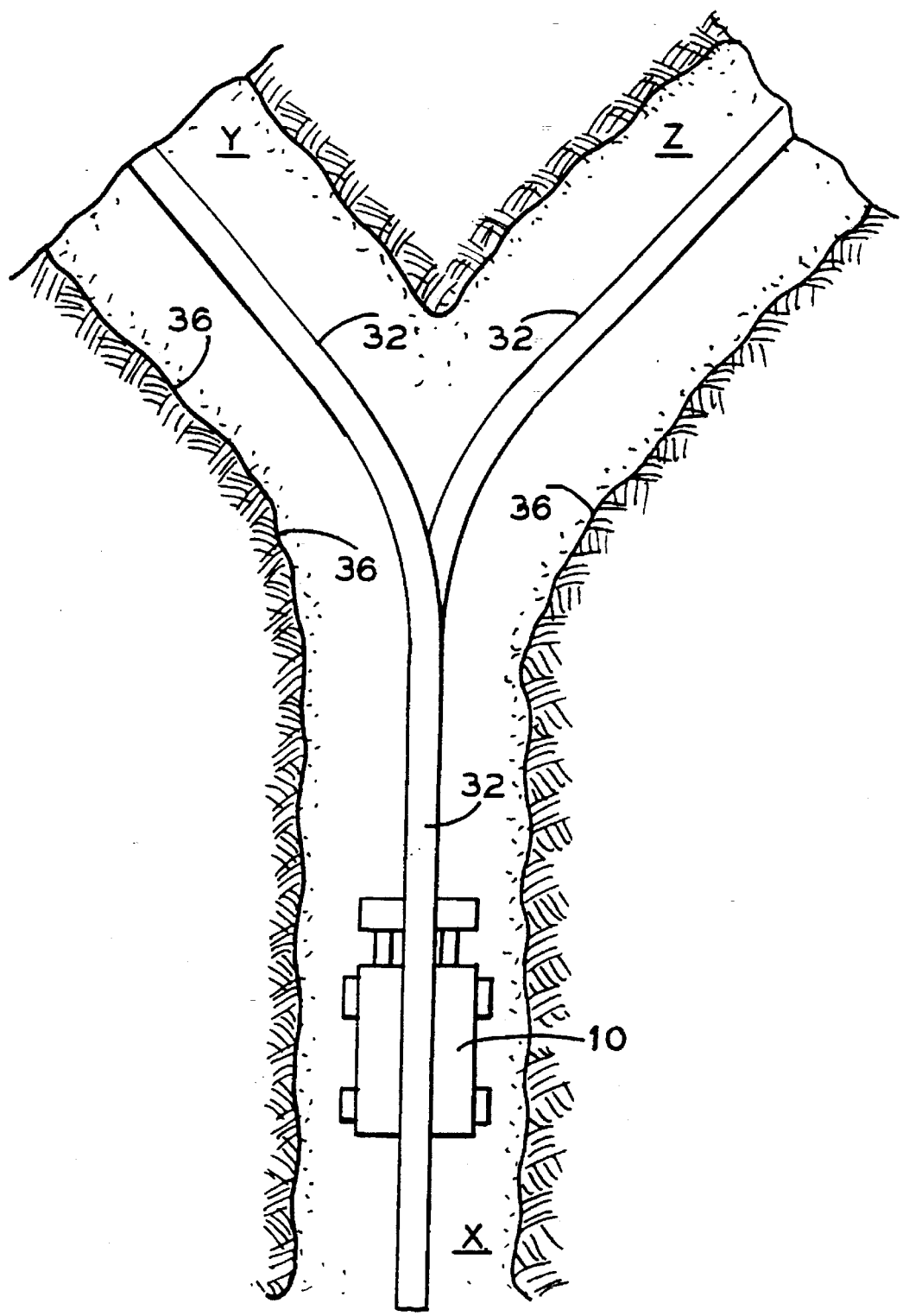
FIG. 4 is a plan view of FIG. 1.

Alternatively, the tubes 32 may be installed in multiple specified paths. By controlling illumination of different tubes 32, a vehicle 10 may follow different branched traffic patterns. See FIG. 4. For example, if the tubes 32 are routed between points X and Y, it may be useful to optionally detour the vehicle to location Z. Accordingly, a branch tube 32 may be selectively illuminated while the main line is darkened. In this fashion, the vehicles will follow the tube 32 leading to location Z much the way a train is routed to an alternative location by means of a track switch. Of course, additional branches may provide easy access to any section of the structure. By merely sequentially switching the tubes 32 on and off, the vehicle 10 will follow any prescribed path. The flexibility provided by the easily mounted tubes 32 is considerable.

The lighting tube 32 may either be hung from the back 34 so that it is relatively parallel with the floor. That is, it is irregularly spaced away from the back 34 so that it is relatively straight. Alternatively, the flexible lighting tube 32 may be directly affixed to the back 34 so that it hugs or conforms to the contours and follows undulations of the back 34. Depending on the circumstances, various combinations of the hanging styles may be used. Such an example is shown in FIG. 1.

Figure 3:
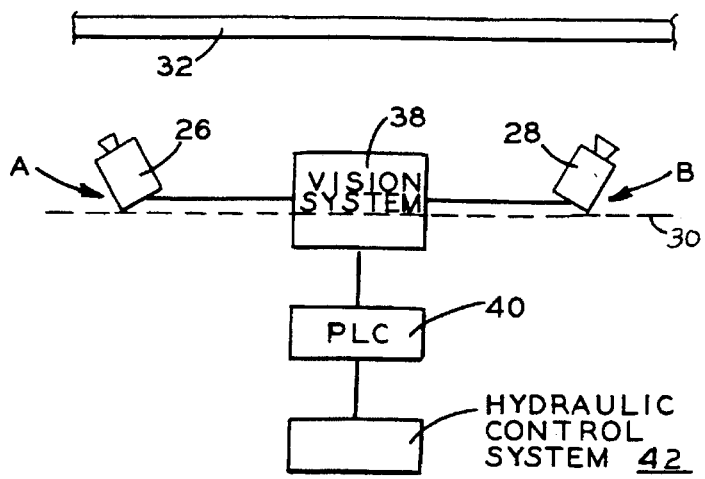
FIG. 3 is a schematic logic diagram of an embodiment of the invention.

The logic of the instant invention is shown in FIG. 3. By utilizing both a forwardly facing camera 28 and a rearwardly facing camera 26, the vehicle 10 may traverse any pattern without having to turn around. Upon reaching the terminus of a route, the cameras will guide the vehicle back along the path or until another energized lighting tube is encountered.

The cameras 26 and 28 are CCD video cameras utilizing wide angle lenses. The signals received by the cameras are processed by/an ITRAN™ Corporation (670 N. Commercial Street, New Hampshire 03101) vision system Model M-D521-001 although similar systems may be employed.

The Itran vision system 38 was originally designed to optically scan products sequentially moving past a fixed site. Used for quality control purposes, the system measures dimensions, verifies tolerances, and detects flaws in products as they are manufactured.

For the instant invention, the vision system was adopted to zero in on the lighting tube, follow it, and correct for any deviations when the vehicle 10 drifts off course.

The guidance process commences by the vision system 38 capturing a two dimensional video image from both the rear and forward cameras 26 and 28. The vision system 38 then analyzes the images by using a gray scale image processing technique to provide fine detail accuracy. Each time the vision system 38 obtains the two dimensional image, it has the ability to locate the lighting tube 32 in multiple forward and rearward locations. The system is capable of looking ahead or behind due to the angled (i.e., non-90°) placement of the cameras and the capabilities of the vision system 38. By utilizing a "heads forward" (or "rearward") scan, the system is capable of determining whether a curve is approaching in advance. This intelligence is crucial to the system, especially at higher speeds, because by knowing the trajectory of the course some distance ahead, the system 38 can anticipate by slowing the vehicle 10 down to a speed safely relevant to the sharpness of the curve. By the same token, the system 38 is able to differentiate between an actual curve and a tilt in the vehicle 10 due to uneven floors 12.

The system 38 then sends the tube 32 information to a programable logical controller (PLC) 40 through a Modbus Plus™ software protocol. The PLC 40, having the appropriate software, monitors the incoming data from the vision system 38. In particular, it continuously monitors the light image falling on the CCD array from the tube 32. By comparing the various angles, distances and gray scale imaging, the PLC 40 gives steering and other commands to the vehicle 10 via hydraulic control system 42.

In an underground environment, the distance between the tube 32 and the vehicle 10 may vary. Therefore, it is critical to determine this distance in order to find out precisely the lateral offset of the vehicle 10 vis-a-vis the tube 32. Accordingly, the PLC 40 is continuously determining the vertical distance and any horizontal offset component for every image.

The software associated with the vision system 38.

1) Detects the light track image created by the lighting tube 32.
2) Determines the position of each light track image in multiple locations in the field of view.
3) Determines the width of each light track.
4) Based upon the track width, the distance from the vehicle 10 to the lighting tube 32 is calculated.
5) Based upon the angle of the guidance cameras 26 and 28 (angles A and B) and in reference to a preset reference point, the position of the track is calculated to dose tolerances.
6) By locating the track in multiple locations simultaneously, the system is capable of anticipating a curve.

It may be appreciated that although the system is especially adapted for underground excavations, the system may be used in structures such as offices, construction sites, warehouses, hospitals, etc. The flexibility afforded by the lighting tube 32 vis-a-vis the canted camera and software combination, permits expeditions automatic guidance. The lighting tube 32 may be hung from just about any surface and the vehicle 10 may traverse just about any surface without a concern for their smoothness or lack thereof. No complicated rigid structures, embedded wires, reflectors, fixed light sources, and lasers are necessary.

While in accordance with the provisions of the statue, there are illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A system for guiding a vehicle through an irregular structure having at least a floor and a back, the system comprising a steerable vehicle, the vehicle including a proximal section and a distal section, the vehicle having a horizontal reference axis, a canted light sensitive apparatus affixed to each of the proximal section and the distal section, a flexible continuous source of light arranged above the vehicle and parallel to the intended path of the vehicle, means for processing positioning signals generated by the light sensitive apparatus vis-a-vis the continuous source of light, means for translating the processing signals into vehicle steering commands, and means for receiving the steering commands and steering the vehicle.

2. The system according to claim 1 wherein the continuous source of light is a lighting tube.

3. The system according to claim 1 wherein the vehicle is an articulated vehicle.

4. The system according to claim 1 wherein the irregular structure is an underground excavation.

5. The system according to claim 1 wherein the light sensitive apparatus is a camera, and the camera is located at an angle other than about 90° from the horizontal reference axis.

6. The system according to claim 1 wherein the continuous source of light conforms to the contours of the back.

7. The system according to claim 1 wherein the continuous source of light is irregularly spaced away from the back so as to form a relatively horizontal source of light.

8. The system according to claim 1 wherein the means for processing positioning signals includes a heads forward scan for anticipating the approach of a curve.

9. The system according to claim 1 wherein the back is irregular.

10. The system according to claim 1 wherein the floor is irregular.

11. The system according to claim 1 wherein the continuous source of light is deployed from one location within the structure to at least a second location within the structure.

12. The system according to claim 1 wherein the continuous source of light includes branches leading to additional locations within the structure.

\* \* \* \* \*